United States Patent [19]
May

[11] 3,789,304
[45] Jan. 29, 1974

[54] GATED DIVIDING CIRCUIT WITH REDUCED TIME VARIATION BETWEEN GATING AND AN OUTPUT SIGNAL

[75] Inventor: Paul Hillard May, Elon College, N.C.

[73] Assignee: Bell Telephone Laboratories, Incorporated, Murray Hill, N.J.

[22] Filed: Oct. 19, 1972

[21] Appl. No.: 299,056

[52] U.S. Cl. .................... 328/41, 307/269, 328/56, 328/61, 328/63
[51] Int. Cl.. H03k 5/156, H03k 17/04, H03k 21/00
[58] Field of Search .... 307/225 R, 269; 328/39, 41, 328/55, 56, 61, 63, 72, 92, 110

[56] References Cited

UNITED STATES PATENTS

| | | | |
|---|---|---|---|
| 3,670,249 | 6/1972 | Meslener | 328/110 |
| 3,070,749 | 12/1962 | Burns et al | 328/56 X |
| 2,831,162 | 4/1958 | Gross | 324/186 |
| 3,024,417 | 3/1962 | Secretan | 328/63 X |
| 3,189,835 | 6/1965 | Marsh, Jr. | 328/63 |
| 3,426,153 | 2/1969 | Kitsopoulds | 328/63 X |
| 3,464,018 | 8/1969 | Cliff | 328/61 |
| 3,548,342 | 12/1970 | Maxey | 328/61 X |
| 3,571,728 | 3/1971 | Andrea | 328/41 |
| 3,624,519 | 11/1971 | Beydler | 328/56 X |

*Primary Examiner*—Rudolph V. Rolinec
*Assistant Examiner*—L. N. Anagnos
*Attorney, Agent, or Firm*—H. L. Logan

[57] ABSTRACT

When the gating signal and clock pulses applied to a gated dividing circuit are unsynchronized, the first output produced by the circuit can appear any time within a time period equal to the intervals between the clock pulses. This time period is reduced, in accordance with the present disclosure, by using more than one such circuit, applying delayed versions of the clock input to the added circuits, and then combining the circuit outputs so that an output is produced whenever a predetermined number of the circuits produces a particular output.

12 Claims, 9 Drawing Figures

GATED DIVIDING CIRCUIT WITH REDUCED TIME VARIATION BETWEEN GATING AND AN OUTPUT SIGNAL

GOVERNMENT CONTRACT

The invention herein claimed was made in the course of or under a contract with the Department of the Army.

BACKGROUND OF THE INVENTION

1. Field of the Invention

This invention relates to the production of timing pulse trains in response to an initiating signal.

2. Description of the Prior Art

Many types of electronic equipment require harmonically related trains of pulses for timing purposes. Furthermore, these trains are frequently required to be initiated in response to an electrical signal related to a particular event. This has been accomplished in the past through the use of a continuously running clock pulse source which feeds a dividing circuit in the form of a counter enabled by the electrical signal. The counter, in such an application, functions as a divider in that it produces one or more pulse trains whose repetition rates are a fraction of that of the clock pulses.

In many cases, the electrical gating signal is not synchronized with the clock pulses. With each gating signal, therefore, the resulting pulse trains from the above-described apparatus are delayed by a fixed period plus a variable period which may be as great as the period between the clock pulses. With repeated gating signals, the output pulse trains appear to jitter with respect to the gating signals. This variable delay action may adversely affect the operation of the equipment being controlled.

The maximum possible variation in delay may obviously be reduced by using a higher clock pulse rate. This of course requires faster acting circuitry. In some applications the circuitry required to meet the desired conditions is either too expensive, too complex, or just impossible to construct.

SUMMARY OF THE INVENTION

An object of the invention is to reduce the above-discussed maximum possible variation in delay without requiring higher clock pulse rates and faster acting circuits. This is accomplished, in accordance with the invention, by using a number of dividing circuits equal to $n$, where $n$ is an integer. The incoming clock pulse train is applied to the dividing circuits so that each dividing circuit receives a clock pulse train which is time displaced from that received by its neighbor by the clock pulse period divided by $n$. The dividing circuit outputs are then combined so that an output is produced whenever a predetermined number of the dividing circuits produces a particular output.

In several embodiments of the invention, the combining means comprises OR gates connected to the outputs of the dividing circuits. In one of these embodiments, a latching circuit responds to the first dividing circuit to produce an output which inhibits the remaining dividing circuits. These embodiments provide a maximum variation in delay response time which is limited to the clock pulse period divided by $n$. Futhermore, the embodiments with the latching circuit provide excellent separation between output signals.

In still other embodiments of the invention, the combining means comprises AND gates and an OR gate wherein more than one dividing circuit must produce an output before the OR gate produces an output. These embodiments also provide a maximum variation in delay time which is limited to the clock pulse period divided by $n$.

These and other objects and features of the invention will become apparent from a study of the following description of several embodiments.

DESCRIPTIONS OF THE DISCLOSED EMBODIMENTS

Figure 1:
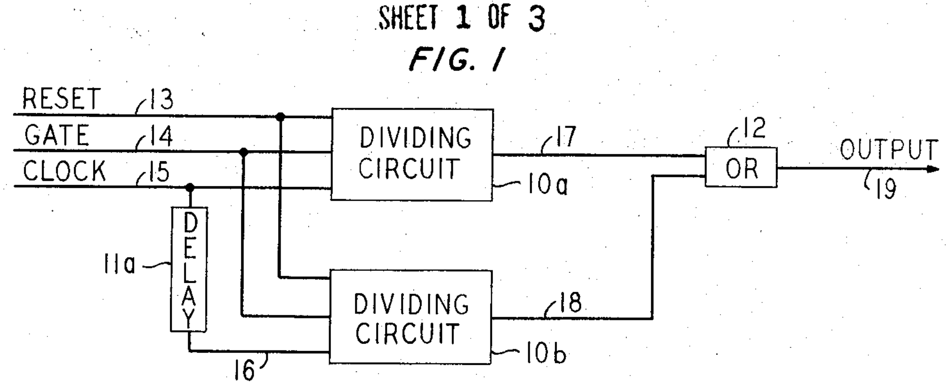
FIG. 1, 6, 8, and 9 are block diagrams of embodiments of the invention.

The embodiment of the invention disclosed in FIG. 1 comprises a pair of dividing circuits **10*a* and 10*b*, a delay circuit 11*a*, and an OR gate 12. A reset lead 13 and a gate lead 14 are connected to each of the dividing circuits. Furthermore, a clock lead 15 is connected to dividing circuit 10*a* and delay circuit 11*a* while a lead 16 connects the output of delay circuit 11*a* to dividing circuit 10*b*. In operation, a signal on reset lead 13 sets the dividing circuits to an initial state while a signal on gating lead 14 enables the dividing circuits so that they are responsive to clock pulses on leads 15 and 16. Output leads 17 and 18 of dividing circuits 10*a* and 10*b*, respectively, are connected to OR gate 12. The output of the embodiment, which comprises the output of OR gate 12, appears on a lead 19**.

Before considering the operation of the embodiment of FIG. 1, a brief description of the problem found in the prior art may be helpful. (In all of the following discussion, fixed delays caused by the response times of devices and the like are considered to be zero as the invention relates to reducing the variable delay.)

Figure 2:
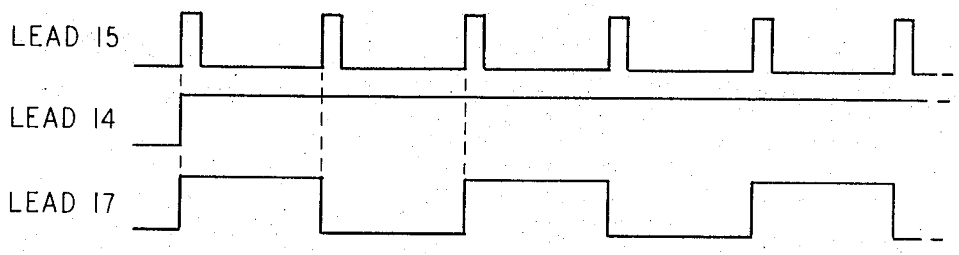
FIG. 2, 3, 4, 5, and 7 depict waveforms used in the description of the embodiments.

Gated frequency dividers found in the prior art do not include dividing circuit **10*b*, delay circuit 11*a*, and OR gate 12. In the absence of such circuitry, the first output after gating can appear any time within a time period equal to the interval between the clock pulses. This may be appreciated by assuming dividing circuit 10*a* to be a simple binary stage and considering the waveforms shown in FIG. 2 and 3. In FIG. 2, the leading edge of the gate signal on lead 14 appears just in time for dividing circuit 10*a* to be responsive to a clock pulse appearing substantially simultaneously on lead 15. This is indicated by the positive potential appearing on lead 17 of FIG. 2. (For purposes of discussion, each waveform in the drawing is assumed to exist between zero and some positive potential value.) On the other hand, in FIG. 3 the leading edge of the gate signal on lead 14 appears just in time to miss a clock pulse on lead 15. Dividing circuit 10*a* therefore does not respond to begin to produce a rectangular wave until the next clock pulse on lead 15. From this discussion, it is believed apparent that dividing circuit 10*a*** may respond, after the leading edge of a gate signal, any time within a time period equal to the clock pulse period.

Figure 4:
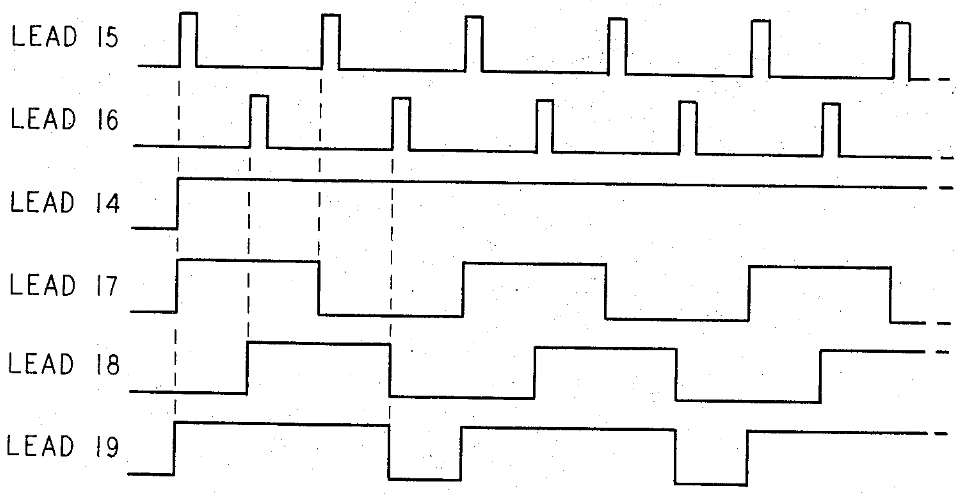

In accordance with the invention, the addition of dividing circuit **10*b*, delay circuit 11*a*, and OR gate 12 reduces the maximum time required to produce an output signal. This may be appreciated by assuming the dividing circuits to be simple binary stages and referring to the waveforms in FIG. 4 and 5. In FIG. 4, the waveforms on leads 15, 14, and 17 are identical to those shown in FIG. 2. Delay circuit 11***a* delays the clock pulses from lead 15 by one-half of the period of the clock pulses; the pulses on lead 16 are therefore those on lead 15 delayed on one-half of a clock pulse period. Dividing circuit 10*a* responds immediately to the pulse on lead 15 and produces a positive potential on lead 17 while dividing circuit 10*b* responds to the delayed version of that pulse and similarly produces a positive potential on lead 18. The next undelayed and delayed clock pulses applied to dividing circuit 10*a* and 10*b* terminate these positive potentials, thereby producing rectangular waves. OR gate 12 produces a positive output as long as either of these rectangular waves are present. The output on lead 19 has a duty factor of approximately 75 percent.

Figure 3:
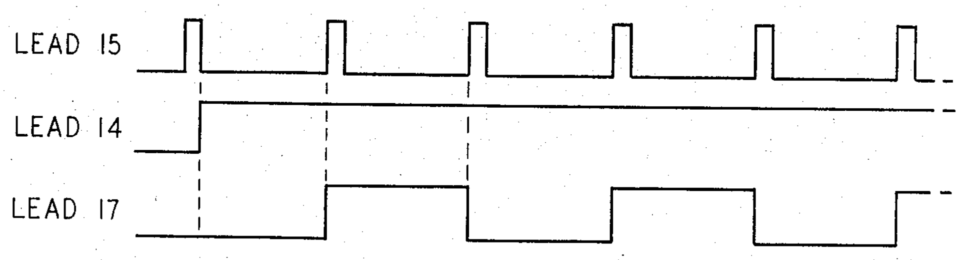
Figure 5:
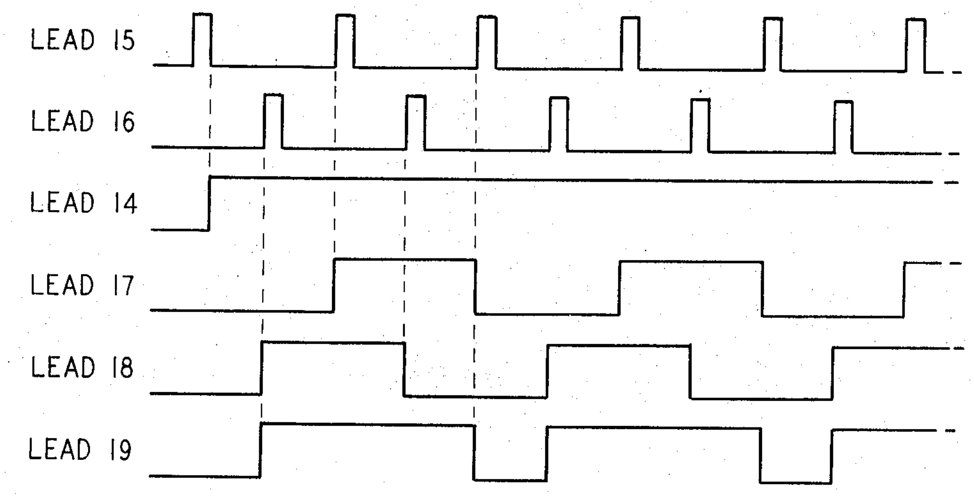

In FIG. 5, the waveforms on leads 15, 14, and 17 are identical to those shown in FIG. 3. Dividing circuit 10*a* does not respond immediately to a pulse on lead 15 for the same reasons presented above with respect to FIG. 3. Dividing circuit 10*b*, however, does respond, about one-half of a clock pulse period later, to the delayed clock pulse appearing on lead 16. After approximately another one-half of a clock pulse period, dividing circuit 10*a* responds to a clock pulse. These circuits respond to subsequent undelayed and delayed clock pulses to produce rectangular wave outputs. The output on lead 19 is positive as long as either of these waves is present. The output on lead 19 again has a duty factor of approximately 75 percent.

It will be noted that the maximum delay possible in the output on lead 19 is one-half of a clock pulse period. This may be reduced even further by using additional dividing circuits and delay circuits. With, for example, *n* dividing circuits fed by *n* clock pulse trains — each displaced timewise from its neighbor by the clock pulse period divided by *n* — the maximum delay in an output on lead 19 is reduced to substantially the clock pulse period divided by *n*.

The duty factor of the output on lead 19 is also a function of *n*. In particular, the intervals between output signals is substantially equal to the clock pulse period divided by *n*. This may present a problem when the interval between output signals becomes so small that equipment connected to output lead 19 fails to respond to discrete signals on the lead. This limitation may be overcome, however, through the use of either of the embodiments disclosed in FIG. 6 and 8.

Figure 6:
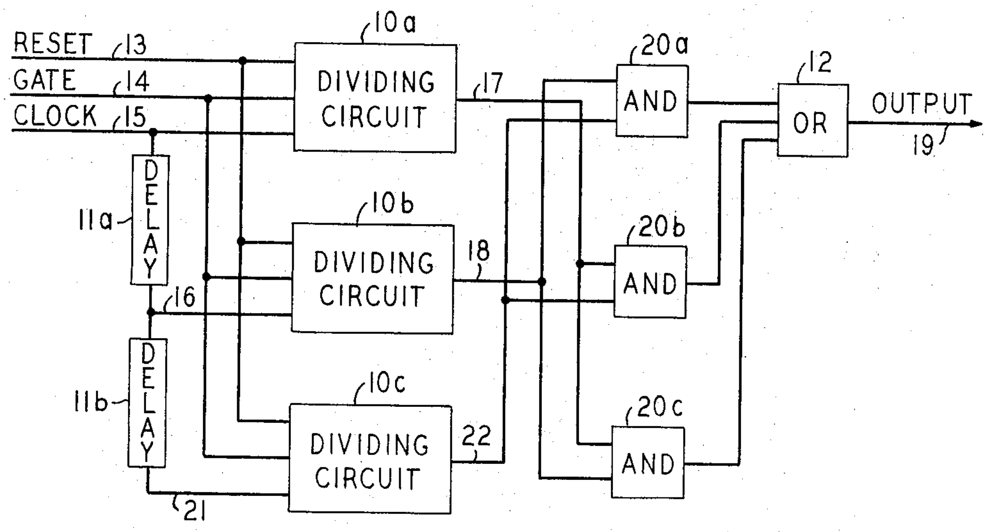

The embodiment of FIG. 6 differs from that of FIG. 1 in that a dividing circuit 10*c*, a delay circuit 11*b*, and AND gates 20*a* through 20*c* have been added. One terminal of delay circuit 11*b* is connected to lead 16 while the other end is connected by way of a lead 21 to dividing circuit 10*c*. Delay circuits 11*a* and 11*b* each provide a delay substantially equal to one-third of the clock pulse period.

Dividing circuit 10*c* has an output lead 22 which is connected to AND gates 20*a* and 20*b*. Output lead 17 of dividing circuit 10*a* is connected to AND gates 20*b* and 20*c* while output lead 18 of dividing circuit 10*b* is connected to AND gates 20*a* and 20*c*. The outputs of AND gates 20*a*, 20*b*, and 20*c* are all connected to OR gate 12.

Figure 7:
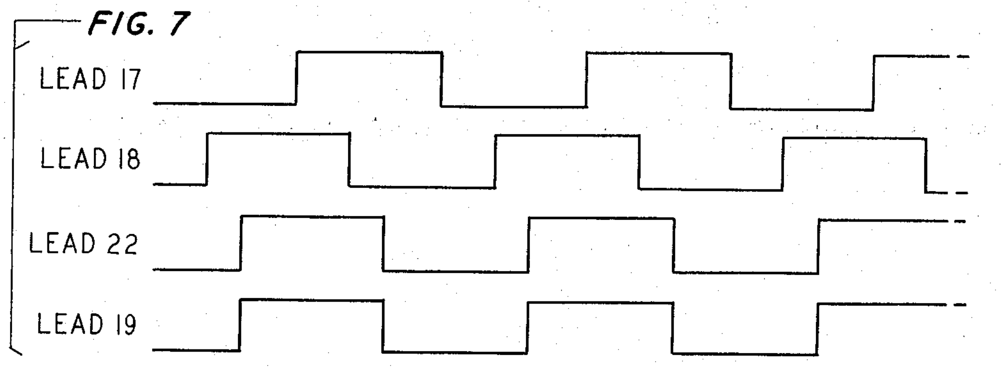

Operation of the embodiment of FIG. 6 may be appreciated by referring to FIG. 7. Although the gating signal and clock pulses are not illustrated in FIG. 7, the waves shown therein represent the case wherein the gate occurs just in time for dividing circuit 10*a* to miss a clock pulse. Rectangular waves appear, therefore, on leads 18 and 22 before lead 17. When the rectangular wave appears on lead 22, OR gate 12 begins to produce a rectangular wave output. At some time later, dividing circuit 10*a* responds to a clock pulse and begins to produce a rectangular wave on its output lead 17. This causes AND gates 20*b* and 20*c* to begin to produce rectangular outputs. Still later, dividing circuit 10*b* responds to a delayed clock pulse and terminates the rectangular wave on its output lead 18, which in turn terminates the outputs from AND gates 20*a* and 20*c*. The output AND gate 20*b*, however, causes OR gate 12 to continue to produce an output. The next delayed clock pulse applied to dividing circuit 10*c*, however, terminates the output from AND gate 20*b* which in turn terminates the output of OR gate 12.

It should be noted that the output on lead 19 has a fifty percent duty cycle for the embodiment of FIG. 6, thus overcoming the potential limitation mentioned above with respect to FIG. 1. Furthermore, the maximum variation in the delay time is still expressed as $1/n$ times the clock pulse period.

The number of AND gates used in embodiments of this form of the invention need not always equal *n*. For example, with *n* equal to four, a 37½ percent duty cycle is produced by using two AND gates and feeding the first of these gates with the outputs of the first and third dividing circuits and feeding the other gate with the outputs from the second and fourth dividing circuits. In this configuration, as in others embodying the invention, the maximum variation of the delay is still $1/n$ times the clock pulse period.

Figure 8:
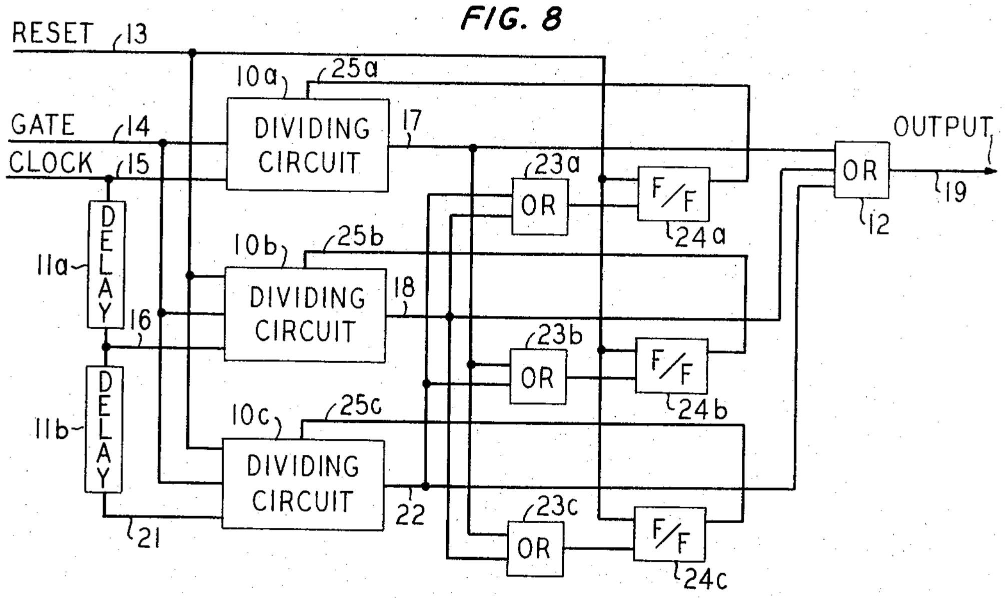

Still another embodiment of the invention which limits the maximum variable delay to the clock pulse period divided by *n* while providing good separation between output signals is disclosed in FIG. 8. This embodiment includes dividing circuits 10*a*, 10*b*, and 10*c*, delay circuits 11*a* and 11*b*, OR gate 12, and leads 13 through 19, 21, and 22 as shown in FIG. 6. It also includes a latching circuit comprising OR gates 23*a*, 23*b*, and 23*c*, flip-flops 24*a*, 24*b*, and 24*c*, and inhibit leads 25*a*, 25*b*, and 25*c* for dividing circuits 10*a*, 10*b*, and 10*c*. Output lead 17 is connected to OR gates 12, 23*b*, and 23*c;* output lead 18 is similarly connected to OR gates 12, 23*a*, and 23*c;* while output lead 22 is similarly connected to OR gates 12, 23*a*, and 23*b*. The output leads of OR gates 23*a*, 23*b*, and 23*c* are connected to flip-flops 24*a*, 24*b*, and 24*c*, respectively. Reset lead 13 is also connected to flip-flops 24*a*, 24*b*, and 24*c* while inhibit leads 25*a*, 25*b*, and 25*c* are connected to flip-flops 24*a*, 24*b*, and 24*c*, respectively.

In operation, the first dividing circuit of FIG. 8 to respond causes two of the OR gates 23*a*, 23*b*, and 23*c* to produce outputs which set their associated flip-flops. The outputs of these flip-flops then inhibit the remaining dividing circuits until the entire embodiment is reset by an input on lead 13. Until reset, the first dividing circuit to respond is the only circuit which responds to each clock pulse appearing at its input. The output on lead 19 comprises the output of this first dividing circuit. This output has a fifty percent duty cycle and, furthermore, has a maximum variable delay equal to one-third of the clock pulse period. In particular, the variable delay is equal to the clock pulse period divided by the number of dividing circuits.

Other forms of latching circuits may be used. One such form, for example, involves interchanging flip-flops 24*a*, 24*b*, and 24*c* with OR gates 23*a*, 23*b*, and 23*c*. In particular, flip-flops 24*a*, 24*b*, and 24*c* are directly connected to receive the outputs of dividing circuits 10*a*, 10*b*, and 10*c*, respectively. The outputs of OR gates 23*a*, 23*b*, and 23*c*, on the other hand, are applied to leads 25*a*, 25*b*, and 25*c*, respectively. The output of each flip-flop is then applied to all of the OR gates with the exception of the one associated with the dividing circuit with which that flip-flop is associated.

Figure 9:
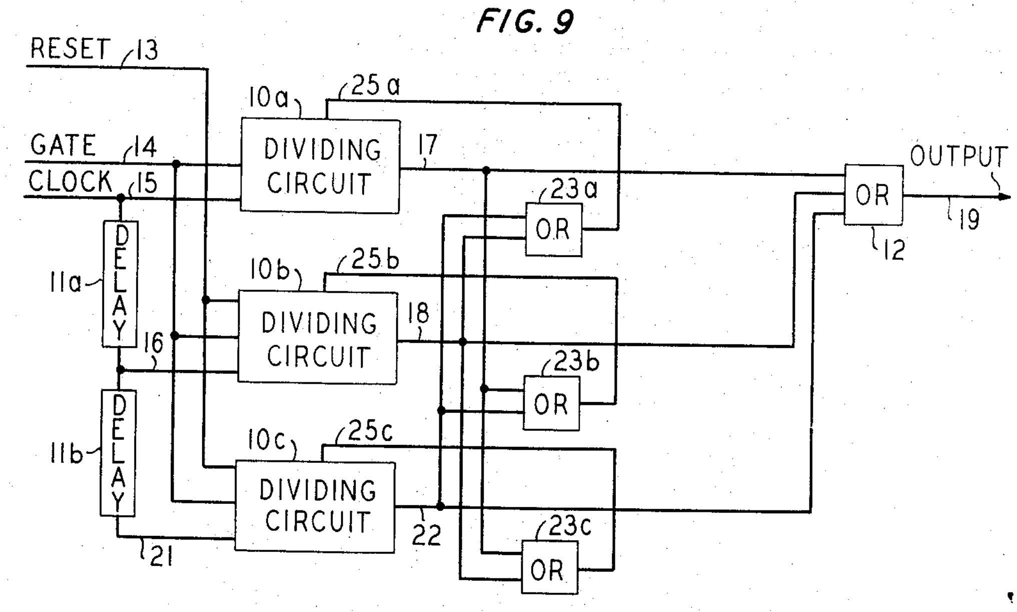

FIG. 9 discloses another embodiment of the invention which utilizes a latching circuit. This embodiment differs from that of FIG. 8 in that flip-flops 24*a*, 24*b*, and 24*c* have been eliminated and the outputs of OR gates 23*a*, 23*b*, and 23*c* have been applied directly to inhibit leads 25*a*, 25*b*, and 25*c*, respectively. In essence, the memory characteristics of the flip-flops have been eliminated so that the dividing circuits are blocked for shorter periods of time. When operating, the first dividing circuit to change state blocks the other two dividing circuits for approximately one clock pulse period. Shortly thereafter, the next dividing circuit changes state and blocks the other two dividing circuits for approximately one clock pulse period. This action continues so that if circuit 10*b* is the first to change state, then they will continue to change state in the order of 10*c*, 10*a*, 10*b*, 10*c*, et cetera. The result is an output pulse train having a period equal to $(n+1)/(n)$ times the clock pulse period, where $n$ equals the number of dividing circuits. As in the other embodiments, the maximum variation in the start-up delay has been reduced to approximately $1/n$ times the clock pulse period.

As implied in the above discussion, the dividing circuits may each comprise a simple binary stage. In such cases, any one of these embodiments may comprise the first stage of a multistage counter wherein output lead 19 feeds the next stage and the maximum variable delay time of the embodiment is directly imputed to the counter. Each of the dividing circuits of the disclosed embodiments, however, is not limited to a simple binary stage but may comprise a multistage unit.

What is claimed is:

1. In a gated dividing circuit which produces, when enabled, an output signal that changes state in response to a predetermined number of unique changes in an input signal applied thereto, the improvement comprising, at least one additional gated dividing circuit substantially identical to the first-mentioned circuit and gated in synchronism therewith, means responsive to said input signal to said first-mentioned circuit for applying delayed versions thereof to said additional circuits, respectively, and means connected to receive the output signals of all of said circuits to produce an output signal in response to a predetermined number of said circuit output signals being in a predetermined state.

2. A combination in accordance with claim 1 in which the last-mentioned means comprises at least one OR gate having input terminals connected to receive the output signals of all of said circuits.

3. A combination in accordance with claim 2 in which the last-mentioned means further comprises, a latching circuit connected to receive the output signals of all of said circuits and, in response to the first output signal received, to disable all of said circuits with the exception of the one producing said first output signal.

4. A combination in accordance with claim 1 in which the last-mentioned means comprises, a plurality of AND gates equal in number to and respectively identifiable with said circuits, means connecting each of said AND gates to receive the output signals of at least two of said circuits none of which are identified with that AND gate, and an OR gate connected to receive the outputs of all of said AND gates.

5. In an electronic frequency divider comprising a binary circuit which produces an output signal that changes between first and second states in response to a particular change in an input signal thereto, the improvement comprising, at least one additional binary circuit substantially identical to said binary circuit in said divider, means simultaneously enabling said circuits, means for applying delayed versions of said input signal to said additional circuits, respectively, whereby the input signal is applied in an increasing delayed manner to successive ones of said circuits, and means connected to receive the output signals from all of said circuits to produce an output signal in response to a predetermined number of said circuit output signals being in a predetermined one of said states.

6. A combination in accordance with claim 5 in which the last-mentioned means comprises at least one OR gate having input terminals connected to receive the output signals of all of said circuits.

7. A combination in accordance with claim 6 in which the last-mentioned means further comprises, a latching circuit connected to receive the output signals of all of said circuits and, in response to the first output signal received, to disable all of said circuits with the exception of the one producing said first output signal.

8. A combination in accordance with claim 5 in which the last-mentioned means comprises, a plurality of AND gates equal in number to and respectively identifiable with said circuits, means connecting each of said AND gates to receive the output signals of at least two of said circuits none of which are identified with that AND gate, and an OR gate connected to receive the outputs of all of said AND gates.

9. In combination, $n$ binary stages where the output of each stage changes between first and second states in response to a particular change in an input signal and $n$ is an integer at least equal to two, an input terminal for receiving a clock pulse train having a predetermined period, means connecting said input terminal to a first of said binary stages, means connecting said input terminal to the remainder of said binary stages to apply delayed versions of said clock pulse train thereto, respectively, wherein the delay increases from stage to stage by an amount substantially equal to said period divided by $n$, and means connected to said stages to produce an output signal in response to a predetermined number of said stages being in a predetermined one of said states.

10. A combination in accordance with claim 9 in which the last-mentioned means comprises at least one OR gate having input terminals connected to receive the outputs of all of said stages.

11. A combination in accordance with claim 10 in which the last-mentioned means further comprises, a latching circuit connected to receive the outputs of all of said stages and, in response to the first output received, to disable all of said stages with the exception of the one producing said first output.

12. A combination in accordance with claim 9 in which the last-mentioned means comprises, a plurality of AND gates equal in number to and respectively identifiable with said stages, means connecting each of said AND gates to receive the outputs of at least two of said stages none of which are identified with that AND gate, and an OR gate connected to receive the outputs of all of said AND gates.

* * * * *